United States Patent [19]
Katz et al.

[11] Patent Number: 5,750,275
[45] Date of Patent: May 12, 1998

[54] THIN FILM HEADS WITH INSULATED LAMINATIONS FOR IMPROVED HIGH FREQUENCY PERFORMANCE

[75] Inventors: Eric R. Katz; David L Berger, both of San Jose, Calif.

[73] Assignee: Read-Rite Corporation, Milpitas, Calif.

[21] Appl. No.: 679,228

[22] Filed: Jul. 12, 1996

[51] Int. Cl.$^6$ ........................................ G11B 5/66
[52] U.S. Cl. .................. 428/694 R; 428/694 TS; 428/694 TM; 428/694 T; 428/692; 428/900; 335/297; 360/126
[58] Field of Search ............. 428/694 R, 694 TS, 428/694 TM, 694 T, 692, 900; 335/297; 360/126

[56] References Cited

U.S. PATENT DOCUMENTS

| | | | |
|---|---|---|---|
| 4,983,465 | 1/1991 | Shimizu et al. | 428/694 TM X |
| 5,026,614 | 6/1991 | Itoh et al. | 428/694 R X |
| 5,061,576 | 10/1991 | Shimizu et al. | 428/694 R |
| 5,576,098 | 11/1996 | Arimoto et al. | 428/694 TS X |
| 5,609,971 | 3/1997 | Matono et al. | 428/694 TM X |

*Primary Examiner*—Daniel Zirker
*Attorney, Agent, or Firm*—Nathan N. Kallman

[57] ABSTRACT

A magnetic thin film recording head includes laminated magnetic pole members, adjacent pole members being separated from each other by nonmagnetic insulating layers to reduce eddy current effects between the laminated members. The nonmagnetic insulating layers extend from the throat region of the head toward the pole tip region and terminate at a distance from the air bearing surface which is a function of the skin depth of the magnetic pole material for the particular recording frequency range being employed in the head.

6 Claims, 2 Drawing Sheets

THIN FILM HEADS WITH INSULATED LAMINATIONS FOR IMPROVED HIGH FREQUENCY PERFORMANCE

FIELD OF THE INVENTION

This invention relates to thin film magnetic heads and in particular to such heads employing pole structures having laminations therein.

DESCRIPTION OF THE PRIOR ART

As recording frequencies used with inductive thin film heads are increased, the associated eddy current effects become more significant. Many prior art heads do not contain a laminated structure in the magnetic poles or yokes, and as a result of eddy current effects, the efficiency of these devices begins to degrade at frequencies above 40–50 MHz. Some prior art heads have introduced laminations in the pole members as shown in FIG. 1, where the structure includes a laminated magnetic layer 11a and a yoke layer 11b for a lower or leading pole member 11, and a laminated layer 12a and a yoke layer 12b for an upper or trailing member 12. FIG. 1 also shows write coil windings 16 and nonmagnetic insulating material 17 between pole members 11, 12 for producing the magnetic field for recording or writing, as is well known in the art. Such a structure does result in some reduction in eddy current losses along the laminated regions, thereby increasing the overall efficiency of the device and resulting in improved signal amplitudes at high frequencies.

In an advance over the structure of FIG. 1, other prior art approaches utilize a nonmagnetic insulating layer 13 between the magnetic layers 11a, 11b of the leading pole structure, and a nonmagnetic insulating layer 14 between the magnetic layers 12a, 12b of the trailing pole structure, as shown in FIG. 2. The insulating layers 13, 14 extend only to the rear of the throat region of the head, but they do act to reduce the magnetic reluctance of the structure enough to result in a useful improvement in the readback efficiency of the head.

However, a problem remains with the structure of FIG. 2 during the writing process. At high frequencies, the magnetic flux generated by coil windings 16 must pass through thin layers along the surfaces of the magnetic elements, termed the "skin depth". As a measure of the penetration of the surface magnetic field into the interior of the magnetic material, this skin depth is commonly expressed in the form $$s = \frac{5030}{\sqrt{\mu f/(\rho \times 10^{-9})}}$$

where $\rho \times 10^{-9}$ is the resistivity in ohm-cm, $\mu$ is the permeability and f is the frequency.

As indicated by this equation, these layers becomes thinner as the operating frequency of the head is increased. By confining the flux path to these thin layers, the flux density in the material actually carrying flux increases to a point where the material saturates. This limits the magnetic flux which can be delivered to the gap area for writing on the recording medium. The net result of this effect is a loss in the "overwrite" performance characteristic of the heads, which ultimately results in a loss in the overall performance capability that can be obtained.

One solution to this problem would be to extend an insulating layer between the laminations all the way to the air bearing surface (ABS) of the structure, but such an approach can also create a problem. The insulation layers at the ABS, being nonmagnetic, act as secondary nonmagnetic gaps, and can result in the generation of additional "ghost pulses", which interfere with the true signal and degrade overall performance.

SUMMARY OF THE PRESENT INVENTION

In order to prevent the loss of the write performance of the head, without introducing the ghost pulse problems associated with completely laminating the pole structure, a modified lamination structure is utilized herein. In this structure, insulating layers between the pole laminations are extended past the ends of the yoke structure, well into the throat region of the head, but are stopped short of the ABS surface defined by the final lapping process.

DESCRIPTION OF THE PREFERRED EMBODIMENT

Figure 1:
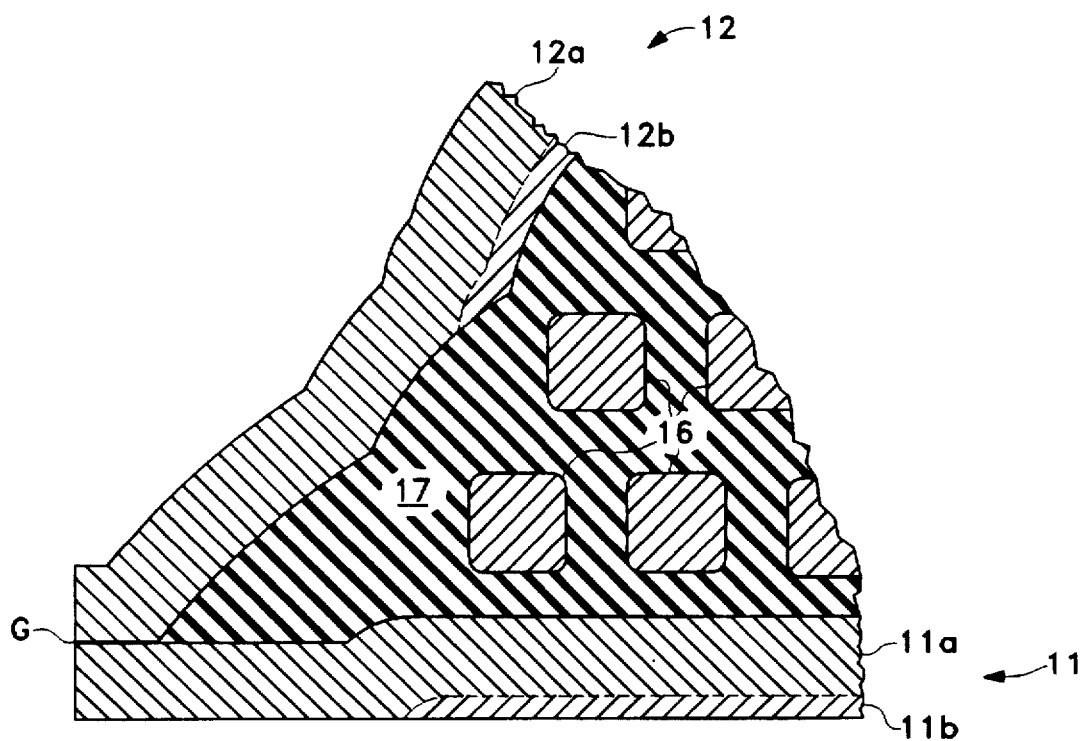
FIG. 1 is a cross-sectional side view of a portion of the pole tip area of one prior art magnetic head without insulation between laminations of the pole tip members.

FIG. 1 shows a prior art magnetic head having, as described above, a first or leading pole structure 11 which includes laminated layer 11a and yoke layer 11b, and a trailing pole structure 12 including laminated layer 12a and yoke layer 12b. Layers 11a, 11b and yoke layers 12a, 12b abut each other and are not separated from each other by any magnetic insulation. As discussed above, prior art structures as in FIG. 1 experience major response problems at higher frequencies because of eddy current effects.

Figure 2:
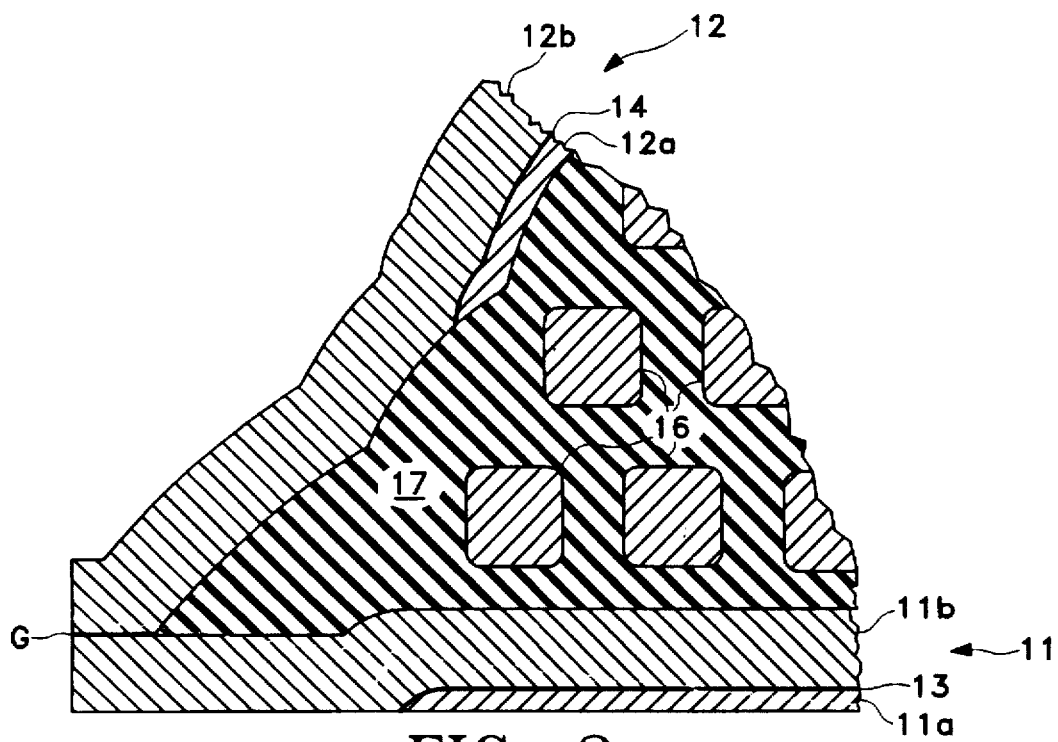
FIG. 2 is a cross-sectional side view of a portion of the pole tip region of another prior art magnetic head employing a partial insulating layer between laminations of the pole tip members.

FIG. 2 illustrates an additional prior art structure in which each of the pairs of laminated pole layers 11a, 11b and layers 12a, 12b are separated from each other by nonmagnetic insulating layers 13, 14, respectively. Magnetic layers 11a and 12a, as well as nonmagnetic insulating layers 13 and 14, extend only a limited distance along the pole structure, so that both leading and trailing pole structures 11 and 12 are each unitary magnetic structures as they approach the zero throat location of the head. As discussed above, this can result in problems in writing because of the skin depth layers and their tendency to cause magnetic saturation as the write frequency increases.

Figure 3:
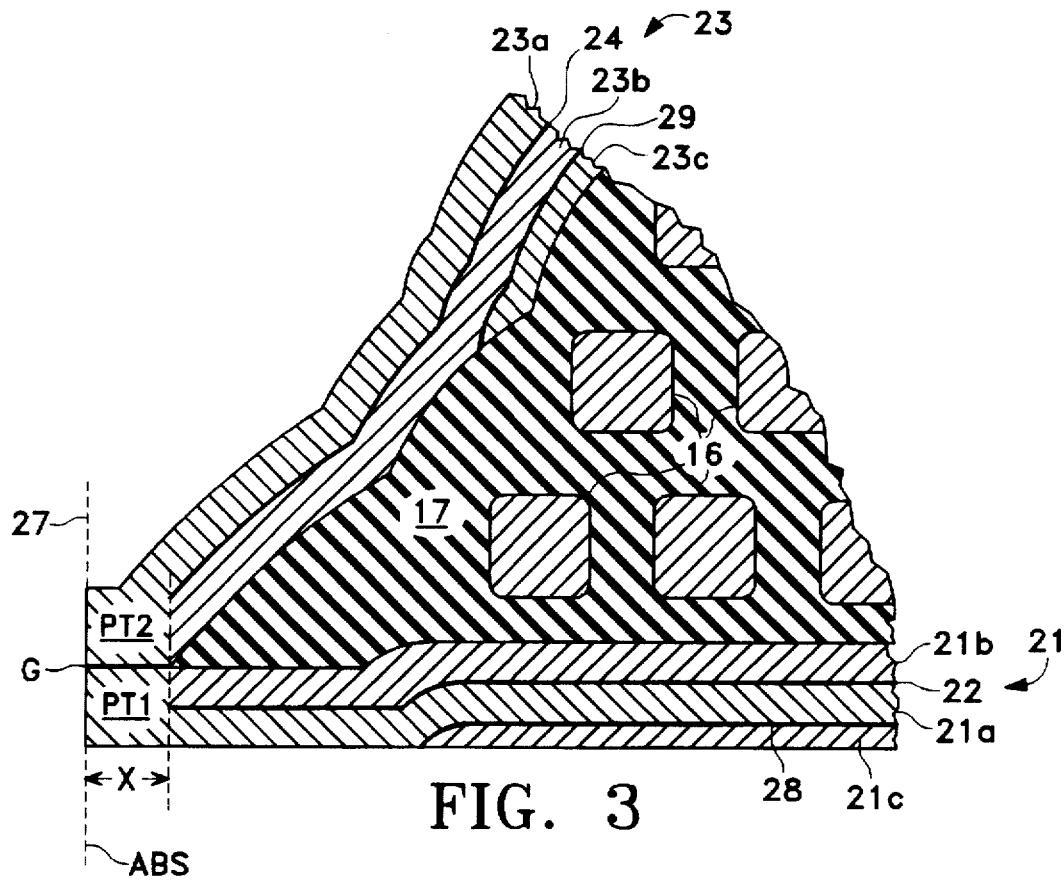
FIG. 3 is a cross-sectional side view of a portion of the pole tip region of one embodiment of the present invention.

FIG. 3 illustrates one embodiment of the present invention employing a leading pole structure 21 having magnetic layers 21a and 21b which are separated from each other by a nonmagnetic insulating layer 22. The magnetic head of FIG. 3 also includes a trailing pole structure 23 having magnetic layers 23a and 23b separated from each other by a nonmagnetic insulating layer 24. Magnetic layers 21a, 21b, 23a, 23b may be of any suitable material having a high magnetic induction $B_s$ such as NiFe, while layers 22, 24 can be composed of a nonmagnetic insulating material such as alumina. Nonmagnetic layers 22, 24 extend across the full width of the pole members, and may have a typical thickness range of 200–400 Å. Layers 21a, 21b, 22, 23a, 23b and 24 extend rearward from the portion illustrated in FIG. 3 to a back region (not shown) where the magnetic pole members converge to form a back gap, as is well known in the art.

Magnetic layers 21a, 21b, 23a, 23b and insulating layers 22, 24 extend forward in FIG. 3, and the magnetic layers converge at a zero throat location. Insulating layers 22, 24 terminate near the zero throat location at a distance X from the ABS ends of the magnetic pole members. The ends of the pole tip members PT1, PT2 define the sensing edge or ABS 27 for the head, the ABS representing the surface which is closest to the record medium and which acts to support the head in a floating or air-bearing relationship with the recording medium.

The distance X represents a multiple of the skin depth for the particular signal frequency being employed in the recording process. A typical skin depth range for current and future magnetic recording frequencies is 0.2 μm to 2 μm. For a typical recording frequency range of 50 MHz to 200 MHz, the distance X preferably is no more than two to three times the skin depth.

Although the use of magnetic heads having magnetic lamination with insulating layers therebetween extending to the sensing edge of the head has been known in the video recording art, these teachings cannot be extended to heads for magnetic disks. This is because in the structure of video heads, the laminations are perpendicular to the recording medium so that ghost pulses are not a problem even though the laminations extend to the sensing edge of the head. However, with heads for use with magnetic disks, the head laminations are parallel to the recording medium, and tests conducted in connection with the present invention have shown that disk heads with laminations extending to the sensing edge of the head do produce undesirable ghost pulses. Thus, it is important in the present invention to terminate the laminated nature of the pole tip structure short of the ABS.

Figure 4:
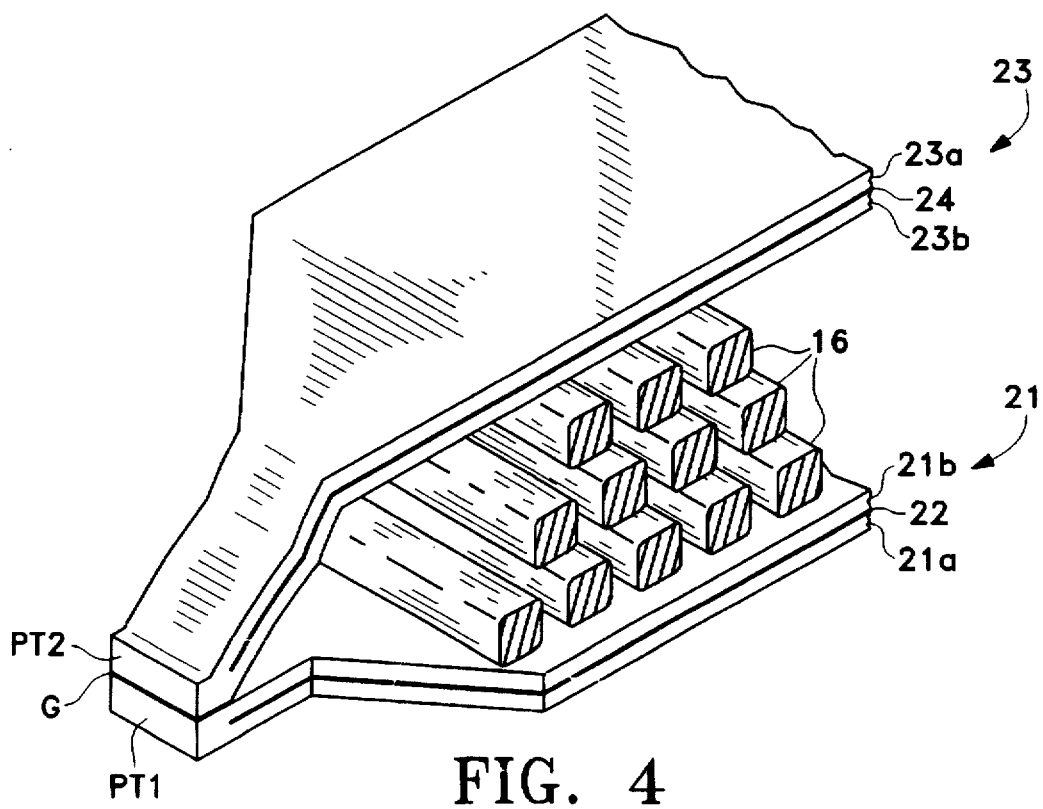
FIG. 4 is an isometric view of a portion of a magnetic head in accordance with this invention including the pole tip regions and extensions of the pole members therefrom.

FIG. 4 is an isometric view of a larger portion of the head of this invention than is shown in FIG. 3. As seen in FIG. 4, the leading magnetic pole layers 21a, 21b, insulating layer 22, and trailing magnetic pole layers 23a, 23b and insulating layer 24 diverge from each other after the zero throat location and extend toward the back region of the head.

As an extension of the invention, as shown in FIG. 3, an optional additional pole lamination layer 21c may be provided adjacent pole layer 21a and magnetically isolated therefrom by a nonmagnetic insulating layer 28. Similarly, an optional additional pole lamination layer 23c may be added to the trailing pole structure and separated from lamination 23b by a nonmagnetic insulating layer 29. Magnetic layers 21c, 23c and insulating layers 28, 29 do not extend toward the pole tip region to the same extent that layers 21a, 21b, 22, 23a, 23b and 24 do, but the optional lamination layers and associated insulation layers provide additional magnetic material to the structure while reducing the effects of eddy current deterioration of the performance of the head.

Although not illustrated in the drawings, the present invention may be employed in a magnetic head utilizing a magnetoresistive (MR) read element and an inductive write element, as well as in a head having both inductive write and read elements.

What is claimed is:

1. A magnetic disk recording head incorporating a thin film transducer for recording signals on a planar magnetic disk comprising:

a first magnetic pole member and a second magnetic pole member;

said first and said second magnetic pole members each having pole tip portions spaced from each other at one end of each of said pole members, said ends of said pole tip portions defining an air bearing surface;

each of said first and said second pole members being formed of a plurality of adjacent laminated magnetic members; and nonmagnetic insulating material disposed between said adjacent laminated members of said first and said second pole members along the lengths thereof to a distance spaced from said air-bearing surface.

2. A thin film head as in claim 1 in which said nonmagnetic insulating material is alumina.

3. A thin film head as in claim 1 in which said distance is a function of the skin depth of said magnetic pole members.

4. A thin film head as in claim 3 in which said distance is no more than two to three times greater than said skin depth.

5. A thin film head as in claim 1 in which said magnetic pole members are NiFe.

6. A thin film head as in claim 1 in which each of said first and said second pole members is formed of three of said adjacent laminated magnetic members.

\* \* \* \* \*